(12) United States Patent
Matsuura et al.

(10) Patent No.: US 9,079,808 B2
(45) Date of Patent: Jul. 14, 2015

(54) GAS GENERATOR, GAS GENERATOR HOLDER AND METHOD FOR MANUFACTURING GAS GENERATOR HOLDER

(75) Inventors: Toshio Matsuura, Himeji (JP); Shigeru Maeda, Himeji (JP); Eiji Komatsu, Himeji (JP); Masahiro Kato, Himeji (JP); Kenichirou Yamashita, Himeji (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/877,826

(22) PCT Filed: Oct. 3, 2011

(86) PCT No.: PCT/JP2011/072739
§ 371 (c)(1),
(2), (4) Date: Apr. 4, 2013

(87) PCT Pub. No.: WO2012/046678
PCT Pub. Date: Apr. 12, 2012

(65) Prior Publication Data
US 2013/0199400 A1 Aug. 8, 2013

(30) Foreign Application Priority Data

Oct. 6, 2010 (JP) ................................. 2010-226443

(51) Int. Cl.
*B60R 21/26* (2011.01)
*C06D 5/00* (2006.01)
(Continued)

(52) U.S. Cl.
CPC . *C06D 5/00* (2013.01); *B21K 23/00* (2013.01); *F42B 3/103* (2013.01); *F42B 3/195* (2013.01); *F42B 3/26* (2013.01); *B60R 22/1954* (2013.01)

(58) Field of Classification Search
CPC ....... B60R 22/1954; F42B 3/26; F42B 3/103; F42B 3/195

USPC ........ 280/736, 741; 102/202.12, 202.14, 530, 102/531
See application file for complete search history.

(56) References Cited

U.S. PATENT DOCUMENTS 4,943,086 A * 7/1990 Cunningham ................ 280/741
5,241,910 A 9/1993 Cunningham et al.
(Continued)

FOREIGN PATENT DOCUMENTS

CN 1395503 A 2/2003
CN 1833923 A 9/2006
(Continued)

OTHER PUBLICATIONS

International Search Report Issued Nov. 22, 2011 in PCT/JP11/72739 Filed Oct. 3, 2011.
(Continued)

*Primary Examiner* — Paul N Dickson
*Assistant Examiner* — Robert A Coker
(74) *Attorney, Agent, or Firm* — Oblon, McClelland, Maier & Neustadt, L.L.P.

(57) ABSTRACT

A gas generator includes a holder made of metal having assembled thereto a cup filled with a gas generating agent and an igniter for burning the gas generating agent. The holder includes a body part, and an igniter fixing engagement part and a cup fixing engagement part projecting from the body part. These engagement parts are bent, so that the igniter and the cup are fixed by crimping to the holder. The engagement parts are both finish shaped by forging processing. A metal flow appearing in superficial layers of the engagement parts extends continuously from the body part through the engagement parts to return to the body part, without being divided in surfaces of the engagement parts.

12 Claims, 11 Drawing Sheets

(51) Int. Cl.
*F42B 3/103* (2006.01)
*F42B 3/195* (2006.01)
*F42B 3/26* (2006.01)
*B21K 23/00* (2006.01)
*B60R 22/195* (2006.01)

(56) References Cited

U.S. PATENT DOCUMENTS

| | | | |
|---|---|---|---|
| 7,377,545 B2* | 5/2008 | Kodama et al. | 280/736 |
| 7,516,701 B2* | 4/2009 | Kurita et al. | 102/530 |
| 7,726,241 B2* | 6/2010 | Stevens | 102/202.12 |
| 7,726,242 B2* | 6/2010 | Stevens | 102/202.12 |
| 8,176,851 B2* | 5/2012 | Kodama et al. | 102/530 |
| 2002/0073872 A1* | 6/2002 | Enzmann et al. | 102/530 |
| 2002/0079680 A1* | 6/2002 | Moquin et al. | 280/736 |
| 2002/0189487 A1* | 12/2002 | Kubo et al. | 102/530 |
| 2004/0245753 A1 | 12/2004 | Kato et al. | |
| 2006/0150855 A1* | 7/2006 | Maruyama et al. | 102/530 |
| 2006/0162607 A1* | 7/2006 | Kodama et al. | 102/530 |
| 2006/0207459 A1 | 9/2006 | Nishina | |
| 2007/0006628 A1 | 1/2007 | Tabei et al. | |
| 2007/0095236 A1* | 5/2007 | Maruyama et al. | 102/202.9 |
| 2007/0193465 A1 | 8/2007 | Stevens | |
| 2010/0186615 A1* | 7/2010 | Kodama et al. | 102/530 |

FOREIGN PATENT DOCUMENTS

| | | |
|---|---|---|
| EP | 1 736 255 A1 | 12/2006 |
| JP | 2006 256561 | 9/2006 |
| JP | 2008 37389 | 2/2008 |
| WO | 2005 099929 | 10/2005 |
| WO | 2010 116749 | 10/2010 |

OTHER PUBLICATIONS

Extended European Search Report issued Feb. 6, 2014 in Patent Application No. 11830610.9.

Office Action issued Jan. 22, 2015 in Chinese Patent Application No. 201180048334.0 (with English translation).

* cited by examiner

FIG.8

| SAMPLE NO. | EXAMPLE ||||| COMPARATIVE EXAMPLE |||||
|---|---|---|---|---|---|---|---|---|---|---|
| | IGNITER FIXING ENGAGEMENT PART ||| CUP FIXING ENGAGEMENT PART ||| IGNITER FIXING ENGAGEMENT PART ||| CUP FIXING ENGAGEMENT PART |||
| | THE NUMBER OF BURRS ADHERING TO HOLDER || EVALUATION | THE NUMBER OF BURRS ADHERING TO HOLDER || EVALUATION | THE NUMBER OF BURRS ADHERING TO HOLDER || EVALUATION | THE NUMBER OF BURRS ADHERING TO HOLDER || EVALUATION |
| | 0.2 mm OR MORE AND LESS THAN 2.1 mm | 2.1 mm OR MORE | | 0.2 mm OR MORE AND LESS THAN 2.1 mm | 2.1 mm OR MORE | | 0.2 mm OR MORE AND LESS THAN 2.1 mm | 2.1 mm OR MORE | | 0.2 mm OR MORE AND LESS THAN 2.1 mm | 2.1 mm OR MORE | |
| 1 | 1 | 0 | B | 0 | 0 | A | 3 | 0 | B | 0 | 0 | B |
| 2 | 1 | 0 | B | 0 | 0 | A | 4 | 0 | B | 0 | 1 | C |
| 3 | 2 | 0 | B | 0 | 0 | A | 4 | 0 | B | 0 | 0 | B |
| 4 | 0 | 0 | A | 0 | 0 | A | 5 | 0 | B | 1 | 0 | B |
| 5 | 1 | 0 | B | 0 | 0 | A | 0 | 2 | C | 0 | 0 | B |

* EVALUATION CRITERION  A: NO BURR OF 0.2 mm OR MORE ADHERES
B: BURR OF 0.2 mm OR MORE AND LESS THAN 2.1 mm ADHERES
C: BURR OF 2.1 mm OR MORE ADHERES

FIG.9

| EXAMPLE | | | | COMPARATIVE EXAMPLE | | | |
|---|---|---|---|---|---|---|---|
| IGNITER FIXING ENGAGEMENT PART | | CUP FIXING ENGAGEMENT PART | | IGNITER FIXING ENGAGEMENT PART | | CUP FIXING ENGAGEMENT PART | |
| THE NUMBER AND SIZE OF BURR OF 0.2 mm OR MORE ADHERING TO DIE | EVALUATION | THE NUMBER AND SIZE OF BURR OF 0.2 mm OR MORE ADHERING TO DIE | EVALUATION | THE NUMBER AND SIZE OF BURR OF 0.2 mm OR MORE ADHERING TO DIE | EVALUATION | THE NUMBER AND SIZE OF BURR OF 0.2 mm OR MORE ADHERING TO DIE | EVALUATION |
| 0.6mm × 3 | B | NONE | A | 5.0mm × 1<br>13.0mm × 1 | C | 0.3mm × 1<br>0.6mm × 1<br>0.9mm × 1<br>2.1mm × 1 | C |

\* EVALUATION CRITERION  A: NO BURR OF 0.2 mm OR MORE ADHERES
B: BURR OF 0.2 mm OR MORE AND LESS THAN 2.1 mm ADHERES
C: BURR OF 2.1 mm OR MORE ADHERES

BURR ADHERING POSITION

BURR ADHERING POSITION

60

70

BURR ADHERING POSITION

BURR ADHERING POSITION

BURR ADHERING POSITION

BURR ADHERING POSITION

GAS GENERATOR, GAS GENERATOR HOLDER AND METHOD FOR MANUFACTURING GAS GENERATOR HOLDER

TECHNICAL FIELD

The present invention relates to a gas generator and a gas generator holder provided for this (hereinafter also briefly called a "holder") as well as a method for manufacturing the gas generator holder, and more particularly relates to a gas generator to be incorporated into a seat belt pretensioner device and a gas generator holder provided for this as well as a method for manufacturing the gas generator holder.

BACKGROUND ART

Conventionally, a seat belt apparatus and an air bag apparatus are widespread in view of protection of a rider of an automobile or the like. The seat belt apparatus is equipped in order to prevent the rider from being thrown from his/her seat in the vehicle or to the outside of the vehicle due to an impact resulting from a collision of the vehicle, and binds and fastens the rider to the seat by lapping a belt around the body of the rider.

In recent years, a seat belt apparatus having a pretensioner function for improving a rider protecting function has rapidly become widespread. According to this pretensioner function, the seat belt loosened due to the thickness of clothes or the like is instantaneously wound up upon a collision or immediately before the collision, in order to improve an effect of binding the rider. This pretensioner function is implemented by strongly retracting the seat belt with the pressure of gas output from a gas generator referred to as a micro gas generator (MGG).

This type of gas generator is disclosed in Japanese Patent Laying-Open No. 2008-37389 (Patent Literature 1), for example. The gas generator disclosed in Japanese Patent Laying-Open No. 2008-37389 includes a bottomed, substantially cylindrical cup filled with a gas generating agent generating gas by combustion, an igniter for burning the gas generating agent, and a bottomed, substantially cylindrical holder assembled to the cup coaxially so as to close an opening edge of the cup and holding the igniter so as to face the gas generating agent.

In the gas generator disclosed in Japanese Patent Laying-Open No. 2008-37389, an igniter fixing engagement part for fixing the igniter and a cup fixing engagement part for fixing the cup are provided to project from a body part of the holder. The igniter and the cup are fixed by crimping to the holder by bending the igniter fixing engagement part and the cup fixing engagement part such that portions of the igniter and the cup are respectively sandwiched between these engagement parts and the body part. By adopting this structure, the igniter and the cup can easily be fixed to the holder with good productivity, and high assembling strength can be maintained between these components after fixation.

CITATION LIST

Patent Literature

PTL 1: Japanese Patent Laying-Open No. 2008-37389

SUMMARY OF INVENTION

Technical Problem

Commonly, a holder is shaped by using a metallic block as the material and subjecting that block to a stepwise combination of forging processing, machining processing, punching processing, and the like. Forging processing is performed as rough shaping processing when shaping the holder, and machining processing and punching processing are performed as finish shaping processing for details when shaping the holder. Therefore, machining processing is utilized in general as finish shaping processing for shaping of the aforementioned igniter fixing engagement part and cup fixing engagement part in view of their relatively fine configurations.

However, when the igniter fixing engagement part and the cup fixing engagement part are finish shaped using machining processing, these engagement parts may partially peel off or curl up since they are bent in the step of fixing by crimping the igniter and the cup to the holder, so that burrs are likely to occur. The occurrence of burrs may cause various failures in various steps to be performed subsequently, and particularly if large burrs occur, the burrs may adhere to terminal pins of the igniter to cause a short circuit. Therefore, when manufacturing a gas generator, an operation for removing produced burrs carefully is performed after fixing by crimping the igniter and the cup to the holder.

The present invention was therefore made to solve the problems described above, and has an object to provide a gas generator capable of effectively preventing burrs from occurring when fixing by crimping an igniter and/or a cup to a holder, a gas generator holder provided for this gas generator and a method for manufacturing the gas generator holder.

Solution to Problem

A gas generator based on a first aspect of the present invention includes a cup filled with a gas generating agent generating gas by combustion, an igniter arranged to face the gas generating agent and ignited at a time of working to burn the gas generating agent, and a holder made of metal with the cup and the igniter assembled thereto. The holder includes a body part and an igniter fixing engagement part projecting from the body part. The igniter fixing engagement part is bent such that a part of the igniter is sandwiched between the igniter fixing engagement part and the body part, so that the igniter is fixed by crimping to the holder. In the gas generator based on the first aspect of the present invention, the igniter fixing engagement part is finish shaped by forging processing, so that a metal flow appearing in a superficial layer of the igniter fixing engagement part extends continuously from the body part through the igniter fixing engagement part to return to the body part, without being divided in a surface of the igniter fixing engagement part.

In the gas generator based on the first aspect of the present invention described above, the holder may further include a cup fixing engagement part projecting from the body part. In that case, preferably, the cup fixing engagement part is bent such that a part of the cup is sandwiched between the cup fixing engagement part and the body part, so that the cup is fixed by crimping to the holder. In the gas generator based on the first aspect of the present invention described above, preferably, the cup fixing engagement part is finish shaped by forging processing, so that the metal flow appearing in a superficial layer of the cup fixing engagement part extends continuously from the body part through the cup fixing engagement part to return to the body part, without being divided in a surface of the cup fixing engagement part.

A gas generator based on a second aspect of the present invention includes a cup filled with a gas generating agent generating gas by combustion, an igniter arranged to face the gas generating agent and ignited at a time of working to burn the gas generating agent, and a holder made of metal with the cup and the igniter assembled thereto. The holder includes a body part and a cup fixing engagement part projecting from the body part. The cup fixing engagement part is bent such that a part of the cup is sandwiched between the cup fixing engagement part and the body part, so that the cup is fixed by crimping to the holder. In the gas generator based on the second aspect of the present invention, the cup fixing engagement part is finish shaped by forging processing, so that a metal flow appearing in a superficial layer of the cup fixing engagement part extends continuously from the body part through the cup fixing engagement part to return to the body part, without being divided in a surface of the cup fixing engagement part.

A gas generator holder based on the first aspect of the present invention is a gas generator holder made of metal used with a cup filled with a gas generating agent and an igniter for burning the gas generating agent assembled thereto. The gas generator holder includes a body part and an igniter fixing engagement part projecting from the body part and being bent such that a part of the igniter is sandwiched between the igniter fixing engagement part and the body part, thereby fixing the igniter by crimping. In the gas generator holder based on the first aspect of the present invention, the igniter fixing engagement part is finish shaped by forging processing, so that a metal flow appearing in a superficial layer of the igniter fixing engagement part extends continuously from the body part through the igniter fixing engagement part to return to the body part, without being divided in a surface of the igniter fixing engagement part.

The gas generator holder based on the first aspect of the present invention described above preferably further includes a cup fixing engagement part projecting from the body part and being bent such that a part of the cup is sandwiched between the cup fixing engagement part and the body part, thereby fixing the cup by crimping. In the gas generator holder based on the first aspect of the present invention described above, preferably, the cup fixing engagement part is finish shaped by forging processing, so that the metal flow appearing in a superficial layer of the cup fixing engagement part extends continuously from the body part through the cup fixing engagement part to return to the body part, without being divided in a surface of the cup fixing engagement part.

A gas generator holder based on the second aspect of the present invention is a gas generator holder made of metal used with a cup filled with a gas generating agent and an igniter for burning the gas generating agent assembled thereto. The gas generator holder includes a body part and a cup fixing engagement part projecting from the body part and being bent such that a part of the cup is sandwiched between the cup fixing engagement part and the body part, thereby fixing the cup by crimping. In the gas generator holder based on the second aspect of the present invention described above, the cup fixing engagement part is finish shaped by forging processing, so that a metal flow appearing in a superficial layer of the cup fixing engagement part extends continuously from the body part through the cup fixing engagement part to return to the body part, without being divided in a surface of the cup fixing engagement part.

A method for manufacturing a gas generator holder based on the first aspect of the present invention is a method for manufacturing the gas generator holder based on the first aspect of the present invention. The method includes the steps of punching a rolled material of metal, thereby forming slug, and subjecting one of the slug or a product of the slug to forging processing, thereby finish shaping the igniter fixing engagement part.

A method for manufacturing a gas generator holder based on the second aspect of the present invention is a method for manufacturing the gas generator holder based on the first aspect of the present invention, the gas generator holder further including the cup fixing engagement part. The method includes the steps of punching a rolled material of metal, thereby forming slug, and subjecting one of the slug or a product of the slug to forging processing, thereby finish shaping the igniter fixing engagement part and the cup fixing engagement part.

A method for manufacturing a gas generator holder based on a third aspect of the present invention is a method for manufacturing the gas generator holder based on the second aspect of the present invention. The method includes the steps of punching a rolled material of metal, thereby forming slug, and subjecting one of the slug or a product of the slug to forging processing, thereby finish shaping the cup fixing engagement part.

ADVANTAGEOUS EFFECTS OF INVENTION

According to the present invention, a gas generator capable of effectively preventing burrs from occurring when fixing by crimping an igniter and/or a cup to a holder, a gas generator holder provided for this gas generator and a method for manufacturing the gas generator holder can be provided.

BRIEF DESCRIPTION OF DRAWINGS

FIG. 8 is a table showing the results of observation of adhesion state of burrs to gas generator holders in a verification test using gas generator holders according to an example and a comparative example.

FIG. 9 is a table showing the results of observation of adhesion state of burrs to a die in the verification test using the gas generator holders according to the example and the comparative example.

DESCRIPTION OF EMBODIMENTS

An embodiment of the present invention will be described below in detail with reference to the drawings. A gas generator according to the embodiment described below is a micro gas generator used by being assembled to a pretensioner module to be incorporated into a seat belt apparatus.

Figure 1:
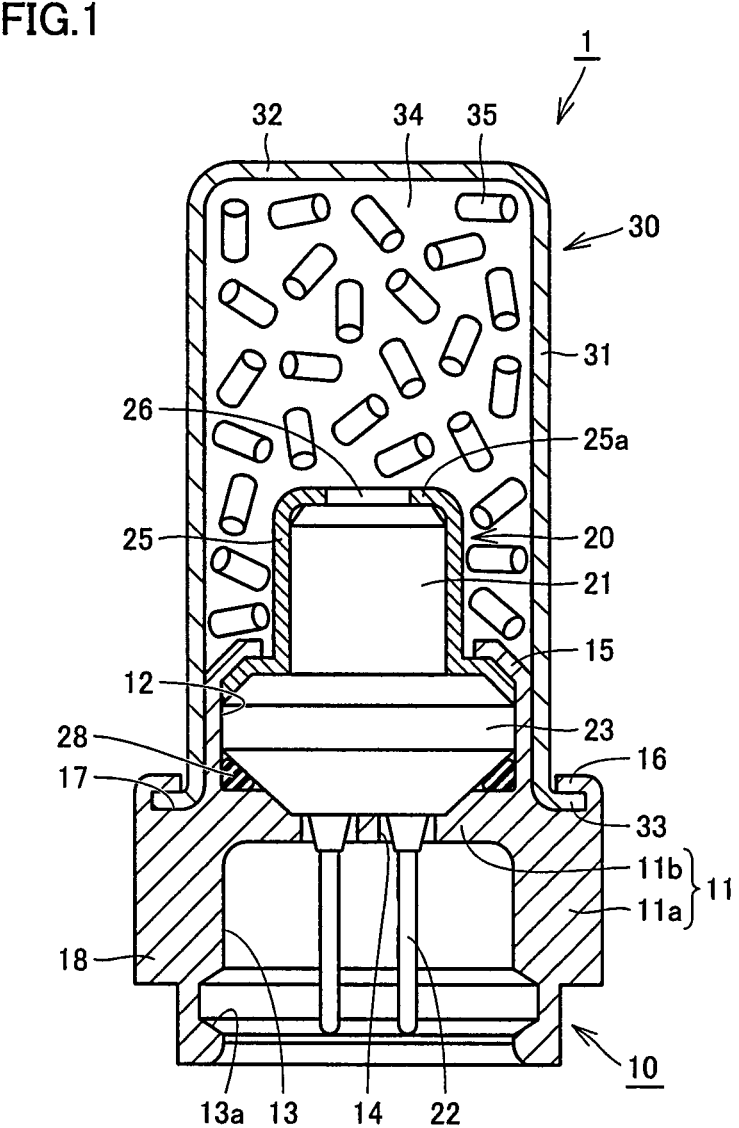
FIG. 1 is a schematic sectional view of a gas generator according to an embodiment of the present invention.
Figure 2:
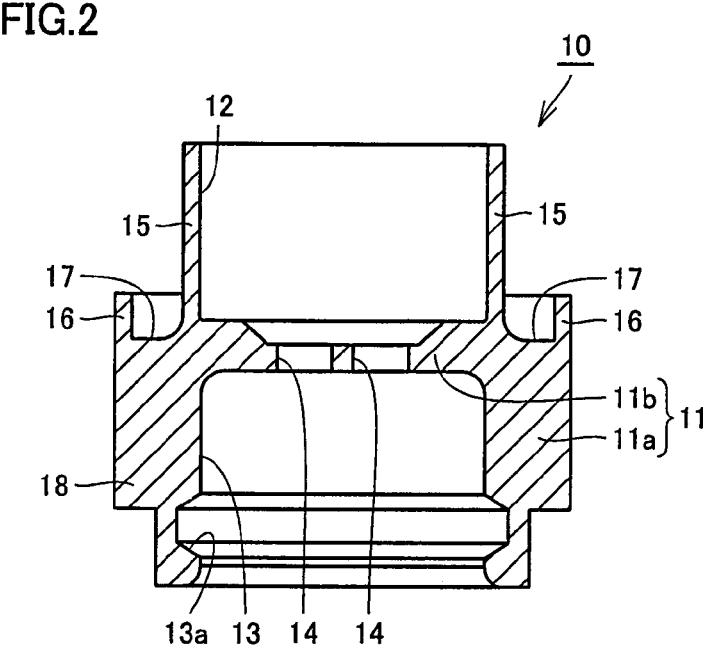
FIG. 2 is a schematic sectional view before a gas generator holder according to the embodiment of the present invention is assembled.

FIG. 1 is a schematic sectional view of a gas generator according to the embodiment of the present invention. FIG. 2 is a schematic sectional view before a gas generator holder shown in FIG. 1 is assembled. First, the structure of the gas generator and the gas generator holder provided for this according to the present embodiment will be described with reference to FIGS. 1 and 2.

As shown in FIG. 1, a gas generator 1 according to this embodiment mainly includes a holder 10, an igniter 20, a cup 30, and a gas generating agent 35. Igniter 20 and cup 30 are both held by holder 10. In more detail, cup 30 is assembled to holder 10 so as to cover igniter 20 with igniter 20 assembled to holder 10. Holder 10 and cup 30 constitute in combination a housing serving as an outer envelope of gas generator 1. Gas generating agent 35 filling cup 30 is stored in a storage space 34 defined by holder 10, igniter 20 and cup 30 after assembly. Accordingly, igniter 20 assembled to holder 10 has a part (an ignition part 21 which will be described later) facing gas generating agent 35. Igniter 20 will also be called a squib.

As shown in FIG. 1, igniter 20 is a device for generating a flame, and includes ignition part 21 storing a priming that is ignited at the time of working to burn gas generating agent 35, a pair of terminal pins 22 connected to ignition part 21 for igniting the priming, and a base (header) 23 holding the pair of terminal pins 22. In more detail, ignition part 21 includes a bridge wire provided to come into contact with the priming and a squib cup attached to base 23 so as to enclose the priming and the bridge wire therein. The bridge wire has the both ends connected respectively to the leading ends of the pair of terminal pins 22 held by base 23 in the squib cup.

A Nichrome wire or the like is employed as the bridge wire in general, while ZPP (zirconium potassium perchlorate), ZWPP (zirconium tungsten potassium perchlorate) or the like is employed as the priming in general. A component made of metal or plastic is employed as the squib cup in general. Ignition part 21 may be filled not only with the priming but also with an inflammation agent.

When a collision is sensed, a prescribed quantity of current flows to the bridge wire through terminal pins 22. Joule heat is generated in the bridge wire due to the prescribed quantity of current flowing to the bridge wire, so that the priming is ignited to start combustion. A high-temperature flame (gas and thermal particles) resulting from the combustion bursts the squib cup storing the priming, and ignites gas generating agent 35. The time from the flowing of the current to the bridge wire up to working of igniter 20 is usually not more than 3 milliseconds if a Nichrome wire is employed for the bridge wire.

As shown in FIG. 1, cup 30 is formed of a bottomed cylindrical component having one end in the axial direction opened, and is filled with gas generating agent 35. Cup 30 is also a component constituting a part of the housing, and is implemented by a shaped product made of a metallic material such as aluminum or aluminum alloy, for example. Press working through use of a metal die or the like is employed for shaping cup 30 in general.

In more detail, cup 30 has a sidewall 31 and a bottom wall 32, and gas generating agent 35 is stored in storage space 34 defined by these sidewall 31 and bottom wall 32. A flange part 33 extending continuously from the leading end of sidewall 31 toward the outside is provided at the opening edge of cup 30. The opening edge of cup 30 including flange part 33 is a section for fixing cup 30 to holder 10.

Gas generating agent 35 is ignited by igniter 20 and is burnt to generate a large amount of gas. A molding of smokeless powder (cellulose nitrate), a molding of non-azide-based composition consisting of an organonitrogen compound and an oxidizer, or the like is employed as gas generating agent 35. In recent years, attention is being focused on employing a non-nitrocellulose-based gas generating agent generating an extremely small amount of noxious component such as carbon monoxide, as gas generating agent 35.

Any shape such as a granular, pelletlike, cylindrical, or discoidal shape is employed for the molding of gas generating agent 35. Alternatively, a perforated (macaroni-shaped or lotus root-shaped, for example) molding having through-holes therein can also be employed as gas generating agent 35. An optimal shape is selected depending on the specification of the pretensioner module to which gas generator 1 is assembled. In addition to the shape, the size of the molding and the like of gas generating agent 35 are selected in consideration of the linear burning rate, the pressure index, and the like. The loading weight of gas generating agent 35, which may be properly varied with the specification of the pretensioner module to which the gas generator is assembled, is set at about 0.2 grams to 2.0 grams in general when smokeless powder is used.

As shown in FIG. 1, holder 10 is a component for holding igniter 20 and cup 30, and has a bottomed, substantially cylindrical shape. Holder 10 is also a component constituting a part of the housing, and is implemented by a shaped product made of a metallic material such as aluminum, aluminum alloy and an iron-based material including stainless steel, for example. Holder 10 is shaped by conducting a stepwise combination of a plurality of processes of forging, punching and machining which will be described later, and in more detail, is shaped into a desired shape by repetition of pressurized fluidization caused by these stepwise processes.

As shown in FIGS. 1 and 2, holder 10 mainly has a body part 11 including a tubular part 11a formed in a substantially cylindrical shape and a partitioning part 11b formed in a substantially discoidal shape so as to close an axial end of tubular part 11a that faces cup 30, as well as an igniter fixing engagement part 15 and a cup fixing engagement part 16 provided to project toward cup 30 from the axial end surface of body part 11 that faces cup 30.

Igniter fixing engagement part 15 and cup fixing engagement part 16 both have an annular shape, and are provided to be positioned on a concentric circle when the above-mentioned axial end surface is seen two-dimensionally in the axial direction. Igniter fixing engagement part 15 is a section for fixing by crimping base 23 which is a part of igniter 20, and cup fixing engagement part 16 is a section for fixing by crimping flange part 33 which is a part of cup 30. Igniter fixing engagement part 15 is provided at a position on the inner side of holder 10 in the radial direction of holder 10, and cup fixing engagement part 16 is provided at a position on the outer side relative to igniter fixing engagement part 15 in the radial direction of holder 10.

Holder 10 has a first recess 12 provided in the axial end surface that faces cup 30 and a second recess 13 provided in the axial end surface that faces away from cup 30. Partitioning part 11b mentioned above is located between these first and second recesses 12, 13, and continues to tubular part 11a at its radial end. At a predetermined position of partitioning part 11b, a pair of through-holes 14 are provided through which first recess 12 and second recess 13 communicate.

First recess 12 is a section for receiving and holding igniter 20, and has a bottom surface defined by partitioning part 11b described above and a circumferential surface defined by igniter fixing engagement part 15.

Second recess 13 is a section in which terminal pins 22 of igniter 20 are located and for receiving and holding a connector (not shown) for external connection of igniter 20 via terminal pins 22, and has a bottom surface defined by partitioning part 11b described above and a circumferential surface defined by tubular part 11a. An engagement groove 13a extending annularly in the circumferential direction is provided at a predetermined position in the circumferential surface of second recess 13. Engagement groove 13a is a section to be engaged with a projection provided for the connector inserted in second recess 13 for holding the connector in second recess 13.

Holder 10 further has a groove 17 in the axial end surface that faces cup 30. Groove 17 has an annular shape and is positioned between igniter fixing engagement part 15 and cup fixing engagement part 16. Groove 17 is a section for receiving the opening edge of cup 30 inserted in the axial direction, and has a bottom surface defined by tubular part 11a, an inner circumferential surface defined by igniter fixing engagement part 15, and an outer circumferential surface defined by cup fixing engagement part 16.

A fixed part 18 formed by making a part of tubular part 11a in the axial direction project toward the radially outer side is provided on the outer circumferential surface of holder 10. Fixed part 18 is a section for use in assembling gas generator 1 to the pretensioner module. With this fixed part 18 sandwiched in the axial direction between fixation parts provided for the pretensioner module, gas generator 1 is assembled to the pretensioner module. Cup fixing engagement part 16 described above constitutes an end of fixed part 18 closer to cup 30.

As shown in FIG. 1, igniter 20 is inserted into first recess 12 from the axial end surface of holder 10 in which first recess 12 is provided such that terminal pins 22 are inserted through through-holes 14 provided in partitioning part 11b. Thereby, base 23 of igniter 20 is received in first recess 12, and terminal pins 22 are located in second recess 13. In this state, by bending the leading end of igniter fixing engagement part 15 of holder 10 toward base 23 of igniter 20, base 23 is sandwiched between partitioning part 11b which is a part of body part 11 and igniter fixing engagement part 15, so that igniter 20 is fixed by crimping to holder 10.

Here, a sealing member 28 implemented by an O ring or the like is previously stored in first recess 12 of holder 10, and a gap created between holder 10 and igniter 20 is sealed by sealing member 28. In more detail, sealing member 28 is interposed between partitioning part 11b of holder 10 and igniter fixing engagement part 15 and base 23 of igniter 20, and at this section, this sealing member 28 hermetically seals gas generator 1. A component sufficient in heat resistance and durability is preferably employed as sealing member 28, and a member of EPDM resin, which is a kind of ethylene propylene rubber, for example, is suitably employed.

Ignition part 21 of igniter 20 and an upper portion of base 23 are previously covered by a bottomed, substantially cylindrical cover member 25, and igniter fixing engagement part 15 of holder 10 fixes igniter 20 by crimping together with cover member 25. On bottom part 25a of cover member 25, there is a flame introducing opening 26 that guides hot flame created by burning of the priming stored in ignition part 21 of igniter 20 toward gas generating agent 35. Cover member 25 is implemented by a shaped product made of a metallic material such as an iron-based material including aluminum, aluminum alloy and stainless steel, for example.

Cover member 25 is intended to prevent the squib cup from being burst before the internal pressure of the squib cup fully increases during working of igniter 20. Therefore, by providing cover member 25, the priming can reliably be burnt at high pressures, and as a result, allows the burning speed of the priming to be increased to prevent ignition delay of gas generating agent 35.

On the other hand, the opening edge of cup 30, filled with gas generating agent 35, is inserted into groove 17 of holder 10 in the axial direction. Flange part 33 provided at the opening edge of cup 30 is thus located in groove 17. In this state, the leading end of cup fixing engagement part 16 of holder 10 is bent toward the inner side so as to cover flange part 33. Flange part 33 is thereby sandwiched by tubular part 11a which is a part of body part 11 and cup fixing engagement part 16 described above, so that cup 30 is fixed by crimping to holder 10. By this fixing by crimping, the gap created between holder 10 and cup 30 will be sealed, and at this portion, gas generator 1 will be hermetically sealed.

Next, an operation at the time when the gas generator according to the present embodiment works will be described with reference to FIG. 1.

When a vehicle on which gas generator 1 according to the present embodiment is mounted collides, the collision is sensed by collision sensing means separately provided for the vehicle, and igniter 20 is operated based on this. When igniter 20 is operated, the priming stored in ignition part 21 is ignited and burnt, so that the squib cup is burst.

When the squib cup is burst, a flame produced by the combustion of the priming is ejected through flame introducing opening 26 of cover member 25 toward storage space 34 in which gas generating agent 35 is stored. Gas generating agent 35 is ignited by this flame and is burnt, producing a large amount of gas in storage space 34. The combustion of this gas generating agent 35 rapidly increases the internal pressure of storage space 34 to thereby open cup 30, so that the produced large amount of gas will be led out of gas generator 1.

Then, the large amount of gas led out of gas generator 1 is introduced into operating space of the pretensioner module to drive the pretensioner module, so that the seat belt will be retracted strongly.

Figure 3:
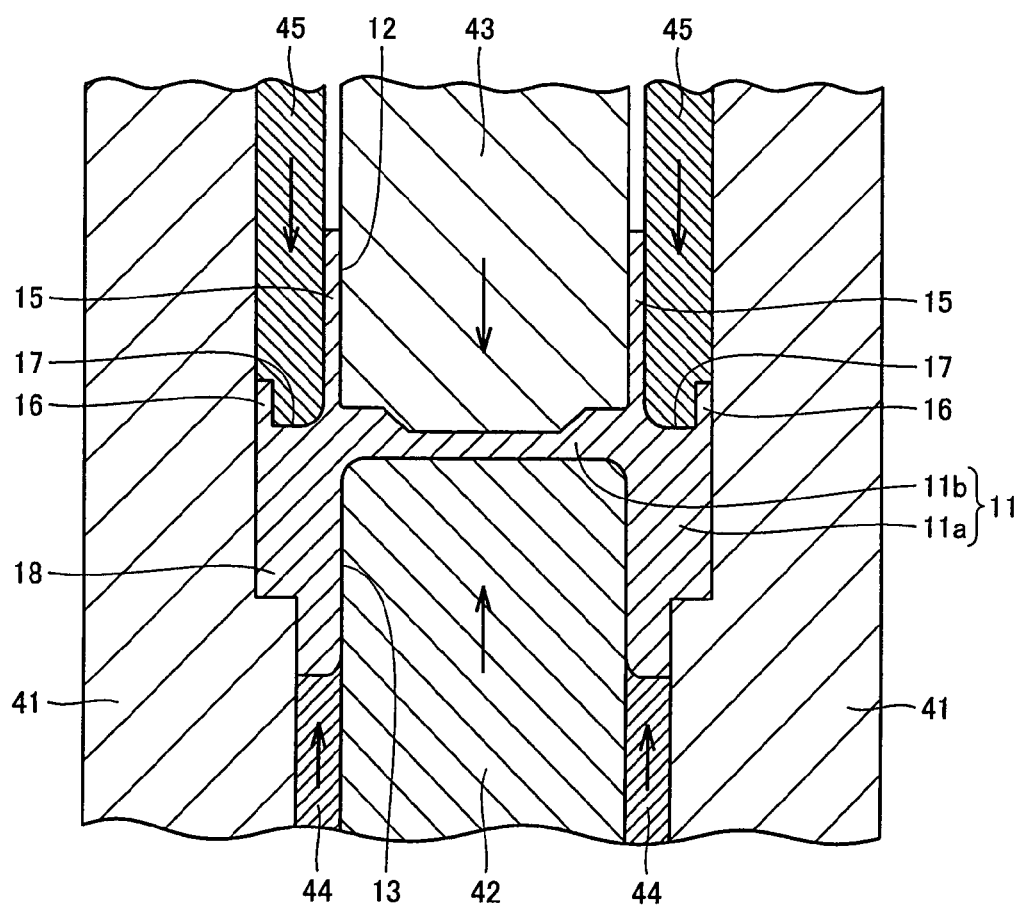
FIG. 3 is a schematic sectional view for specifically illustrating (second) forging processing in a manufacturing flow in accordance with a method for manufacturing the gas generator holder according to the embodiment of the present invention.
Figure 4:
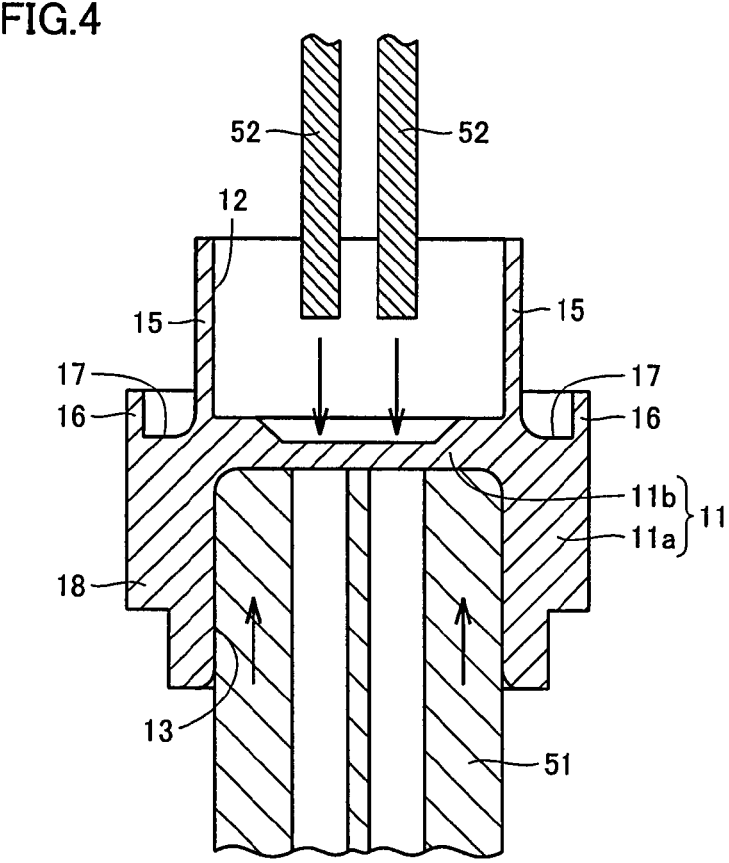
FIG. 4 is a schematic sectional view for specifically illustrating punching processing in the manufacturing flow in accordance with the method for manufacturing the gas generator holder according to the embodiment of the present invention.
Figure 5:
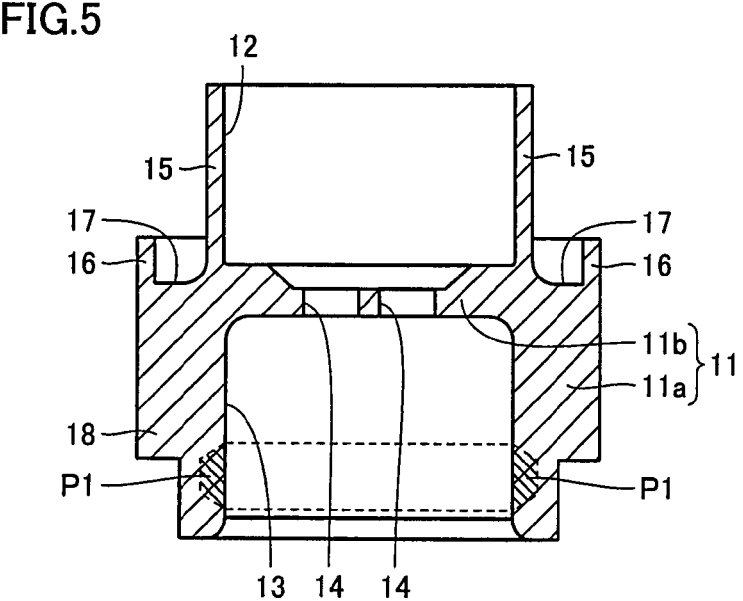
FIG. 5 is a schematic sectional view for specifically illustrating machining processing in the manufacturing flow in accordance with the method for manufacturing the gas generator holder according to the embodiment of the present invention.

Next, a manufacturing flow in accordance with the method for manufacturing the gas generator holder according to the embodiment of the present invention will be described. FIG. 3 is a schematic sectional view for specifically illustrating (second) forging processing in the manufacturing flow in accordance with the method for manufacturing the gas generator holder according to the present embodiment. FIG. 4 is a schematic sectional view for specifically illustrating punching processing. FIG. 5 is a schematic sectional view for specifically illustrating machining processing.

As described above, gas generator holder 10 according to the present embodiment is shaped by a stepwise combination of a plurality of processes of forging, punching and machining. Specifically, when manufacturing holder 10 using aluminum alloy, for example, the processing is carried out sequentially as will be described below.

First, slug (a small metallic block) is formed. Specifically, a rolled material of aluminum alloy is prepared, and by punching this into a predetermined size and shape, slug of aluminum alloy is formed.

Next, first forging processing is conducted. Specifically, the above-described slug is subjected to forging processing using a predetermined die. Rough shaping processing of holder 10 is thereby conducted. As the first forging processing, cold forging is preferably adopted.

Next, a first heat treatment is performed. Specifically, a heat treatment is conducted in which the aluminum alloy block formed by subjecting the slug to the above-mentioned first forging processing is heated to a predetermined temperature, and after the high temperature state is held for a certain time, the aluminum alloy block is cooled rapidly. The heat treatment is a heat treatment called a solution treatment for maintaining a supersaturated solid solution state at room temperature.

Next, second forging processing is conducted. Specifically, the aluminum alloy block after the above-described heat treatment is subjected to forging processing using a predetermined die. Finish shaping processing of the most part of holder 10 is thereby conducted. In more detail, as shown in FIG. 3, finish shaping of portions of holder 10 excluding engagement groove 13a and through-holes 14 is performed using a plurality of dies 41 to 45. That is, by the second forging processing, tubular part 11a excluding the portion where engagement groove 13a is to be formed, partitioning part 11b excluding the portion where through-holes 14 are to be formed, first recess 12, second recess 13, igniter fixing engagement part 15, cup fixing engagement part 16, groove 17, and fixed part 18 are finish shaped. As the second forging processing, cold forging is preferably adopted.

As shown in FIG. 3, it is preferable to provide, at a predetermined position of dies 41 to 45, a buffer (so-called relief portion) into which an excessive material can flow during pressurized fluidization following forging processing, taking into consideration that the amount of aluminum alloy block subjected to forging processing may vary slightly for manufacturing reasons. In dies 41 to 45 shown in FIG. 3, the buffer is provided at a portion of die 45 corresponding to the position where igniter fixing engagement part 15 is to be formed. Since variation in the amount of the above-described aluminum alloy block is very slight, dimensional variation occurring in igniter fixing engagement part 15 will thus fall within design tolerance.

Next, punching processing is conducted. Specifically, above-described holder 10, the most part of which has been finish shaped, is subjected to punching processing using a predetermined die. Finish shaping processing is thereby conducted at a predetermined position of partitioning part 11b of holder 10. In more detail, as shown in FIG. 4, a pair of through-holes 14 are formed in partitioning part 11b of holder 10 using die 51 and a punching die 52.

Next, a second heat treatment is conducted. Specifically, a heat treatment is performed in which holder 10 having been subjected to the above-described punching processing is heated to a predetermined temperature and then cooled. This heat treatment is a heat treatment called an artificial aging treatment for heating, above room temperature, a supersaturated solid solution whose supersaturated solid solution state is maintained at room temperature by conducting the above-described solution treatment, thereby causing a fine secondary phase to be precipitated from the supersaturated solid solution.

Next, cleaning processing is conducted. The cleaning processing is processing for removing foreign substances adhering to the surface of the holder having been subjected to the above-described second heat treatment.

Next, machining processing is performed. Specifically, a cutting tool is used to conduct machining processing at a predetermined position of holder 10 having been subjected to the above-described punching processing. Finish shaping processing is thereby conducted at a predetermined position of tubular part 11a of holder 10. In more detail, a region P1 of holder 10 shown in FIG. 5 is removed using the cutting tool, so that engagement groove 13a is formed in tubular part 11a defining the circumferential surface of second recess 13.

As described above, manufacturing of gas generator holder 10 according to the present embodiment shown in FIG. 2 is completed. Even in the case of manufacturing holder 10 using a metallic material other than aluminum alloy, a similar manufacturing flow is basically adopted.

Figure 6:
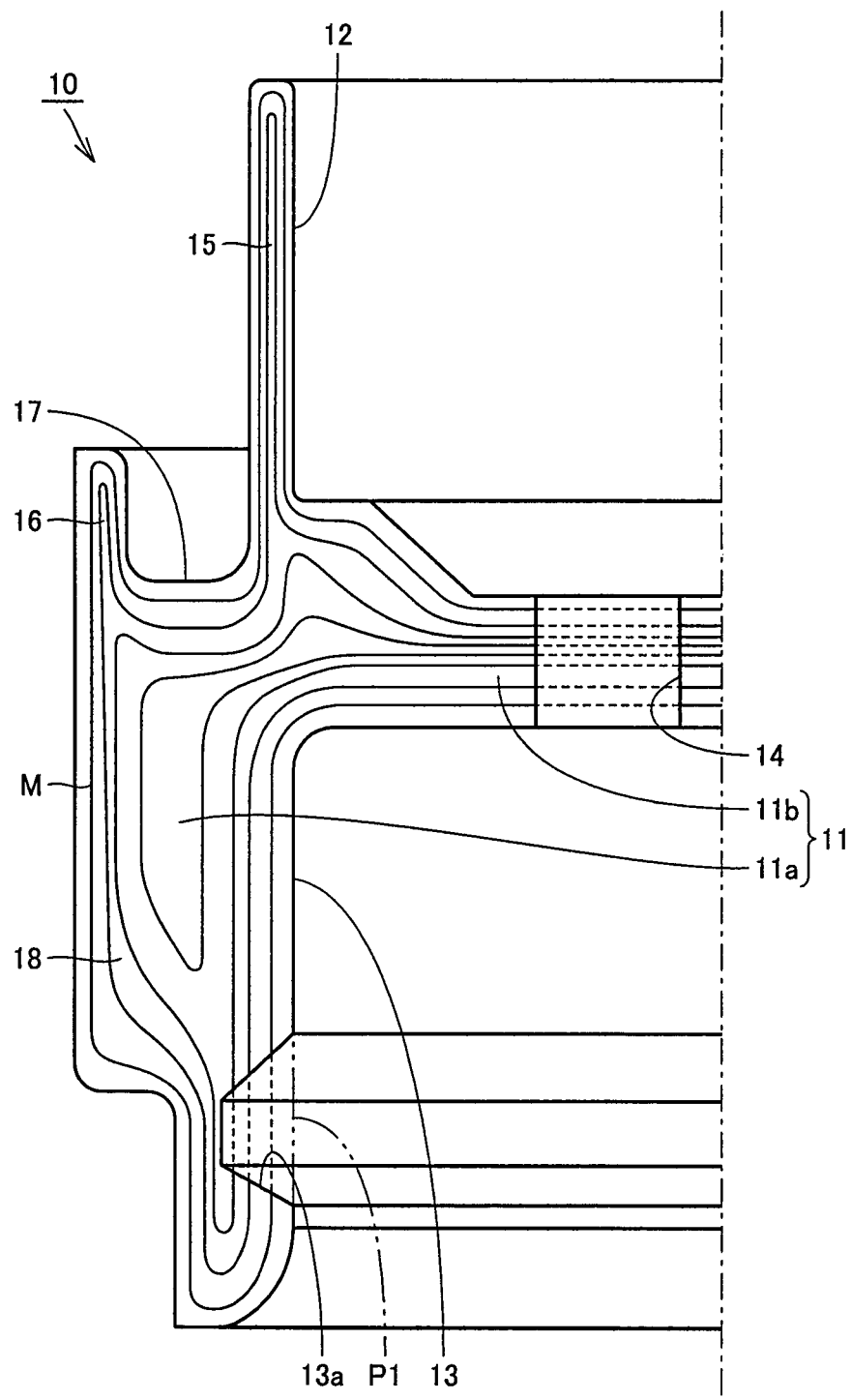
FIG. 6 is a sectional view schematically showing a metal flow of the gas generator holder according to the embodiment of the present invention.
Figure 7:
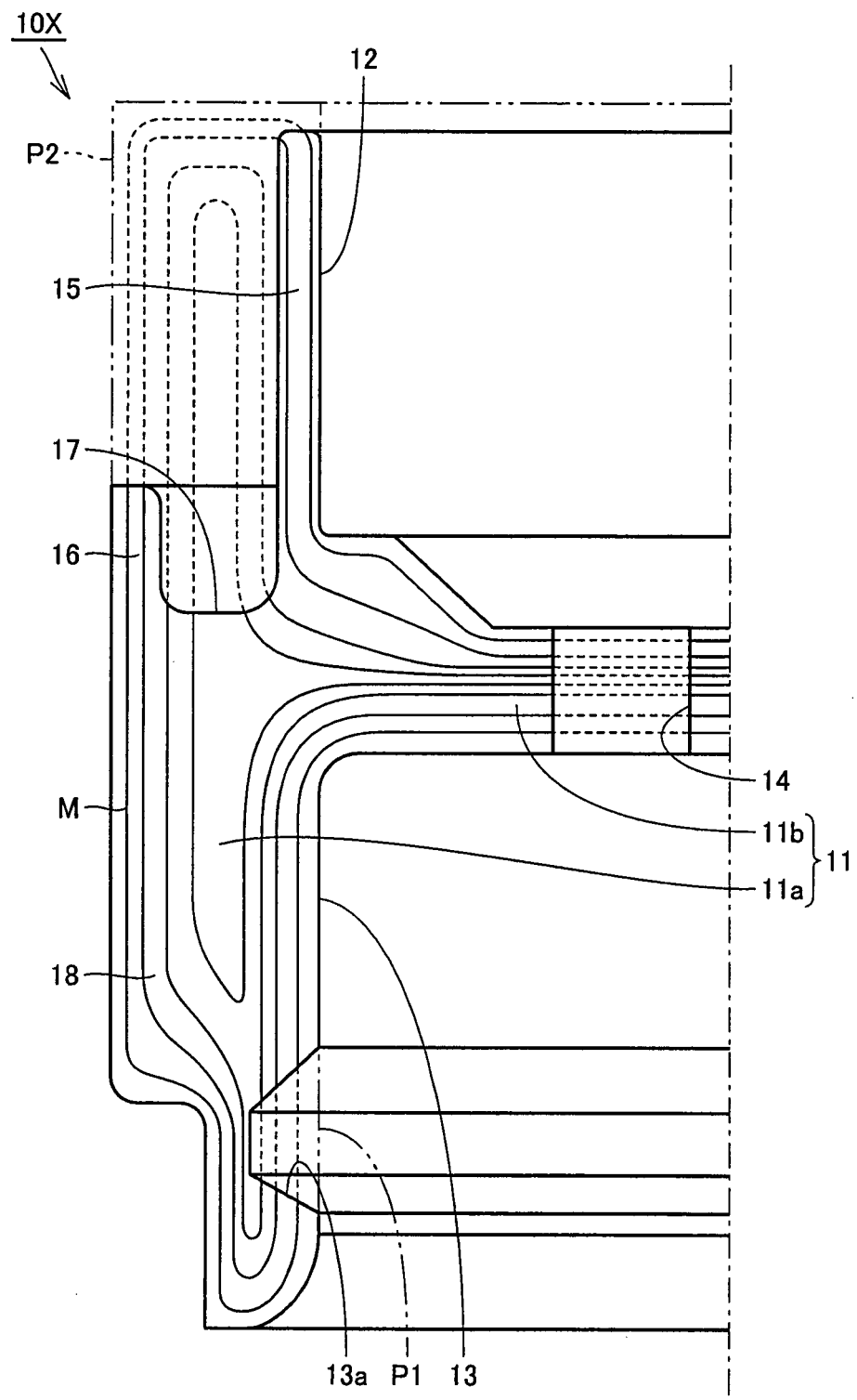
FIG. 7 is a sectional view schematically showing a metal flow of a gas generator holder according to a conventional example.

FIG. 6 is a sectional view schematically showing a metal flow of the gas generator holder according to the present embodiment. FIG. 7 is a sectional view schematically showing a metal flow of a gas generator holder according to a conventional example. Referring now to FIGS. 6 and 7, a characteristic structure appearing in the gas generator holder according to the present embodiment will be described in detail, in comparison with the structure of the gas generator holder according to the conventional example.

In general, when a metallic material is subjected to forging processing, certain directivity occurs in the internal tissue following pressurized fluidization of the metallic material, and this appears as a metal flow. It is known that a shaped product having been subjected to forging processing is superior in shear strength in a direction perpendicular to the metal flow and superior in tensile strength in a direction parallel to the metal flow, and that if the metal flow has a break, the shaped product is inferior in mechanical strength at the broken position.

As shown in FIG. 6, in holder 10 manufactured in accordance with the method for manufacturing the gas generator holder according to the present embodiment described above, since igniter fixing engagement part 15 and cup fixing engagement part 16 have been finish shaped by the second forging processing described above, these igniter fixing engagement part 15 and cup fixing engagement part 16 both have a forged surface, and a metal flow M configured to conform to the forged surface in the superficial layers of igniter fixing engagement part 15 and cup fixing engagement part 16 will appear.

In more detail, in holder 10 according to the present embodiment, metal flow M appearing in the superficial layer of igniter fixing engagement part 15 is formed to extend continuously from body part 11 through igniter fixing engagement part 15 and return to body part 11, without being divided in the surface of igniter fixing engagement part 15. Metal flow M appearing in the superficial layer of cup fixing engagement part 16 is formed to extend continuously from body part 11 through cup fixing engagement part 16 to return to body part 11, without being divided in the surface of cup fixing engagement part 16.

In holder 10 according to the present embodiment, metal flow M is thus not divided in the superficial layer of each of igniter fixing engagement part 15 and cup fixing engagement part 16, so that high mechanical strength will be ensured at these portions. Therefore, in the step of fixing by crimping igniter 20 and cup 30 to holder 10, it is possible to prevent these engagement parts 15 and 16, when bent, from partially peeling off or curling up, as a result of which burrs can be prevented from occurring.

On the other hand, as shown in FIG. 7, in a gas generator holder 10X according to the conventional example, a region P2 shown in the drawing is removed by machining processing not only in engagement groove 13*a* but also in igniter fixing engagement part 15 and cup fixing engagement part 16, and they are finish shaped. Therefore, igniter fixing engagement part 15 and cup fixing engagement part 16 both have machined surfaces excluding the inner circumferential surface of igniter fixing engagement part 15 and the outer circumferential surface of cup fixing engagement part 16, and metal flow M is divided in the machined surfaces of igniter fixing engagement part 15 and cup fixing engagement part 16.

Therefore, holder 10X according to the conventional example is inferior in mechanical strength at the portion where metal flow M is divided. Therefore, in the step of fixing by crimping igniter 20 and cup 30 to holder 10, by pressing a crimping processing die against the leading ends of these engagement parts 15 and 16 and bending engagement parts 15 and 16, they partially peel off or curl up, so that burrs are likely to occur.

In this way, by implementing gas generator 1 and gas generator holder 10 provided for this according to the present embodiment described above and by adopting the method for manufacturing the gas generator holder according to the present embodiment described above, it is possible to effectively prevent burrs from occurring when fixing by crimping igniter 20 and cup 30 to holder 10. It is therefore possible to reduce the likelihood that failures may occur in various steps conducted after crimping processing and to ease the burden of removing burrs having conventionally been done carefully, which makes it possible to obtain many effects, such as improved productivity, improved yield, improved reliability, and reduced manufacturing cost.

In addition, by implementing gas generator 1 and gas generator holder 10 provided for this according to the present embodiment described above and by adopting the method for manufacturing the gas generator holder according to the present embodiment described above, it is possible to increase the mechanical strength of igniter fixing engagement part 15 and cup fixing engagement part 16 as compared to conventional cases. It is therefore possible to obtain the effect of improving the assembling strength of igniter 20 and cup 30 to holder 10.

FIG. 8 is a table showing the results of observation of adhesion state of burrs to the gas generator holders in a verification test using gas generator holders according to an example and a comparative example. FIG. 9 is a table showing the results of observation of adhesion state of burrs to a die in that verification test. Referring to FIGS. 8 and 9, the results of verification test using the gas generator holders according to the example and the comparative example will be described.

In the verification test, five samples based on the above-described embodiment of the present invention (gas generator holder 10 shown in FIG. 6) were actually made as the gas generator holder according to the example, and five samples having a structure similar to that of gas generator holder 10X according to the conventional example shown in FIG. 7 described above were actually made as the gas generator holder according to the comparative example. Then, an igniter and a cup were actually fixed by crimping to these gas generator holders according to the example and the comparative example, and the occurrence state of burrs on that occasion was observed in detail.

In the gas generator holder according to the comparative example, the leading ends of igniter fixing engagement part 15 and cup fixing engagement part 16 of gas generator holder 10 shown in FIG. 6 were removed by cutting, so that metal flow M is divided at the leading ends. Therefore, strictly saying, the gas generator holder according to the comparative example and gas generator holder 10X shown in FIG. 7 differ in structure; however, in the gas generator holder according to the comparative example, since metal flow M is divided only at the leading end of each of igniter fixing engagement part 15 and cup fixing engagement part 16, which means metal flow M is divided at fewer positions than in gas generator holder 10X according to the conventional example shown in FIG. 7, burrs can be prevented from occurring. Therefore, in terms of the unlikelihood that burrs occur, the gas generator holder according to the comparative example can be considered as being in a more advantageous condition than gas generator holder 10X according to the conventional example shown in FIG. 7.

As shown in FIG. 8, in the gas generator holder according to the example, the number of burrs adhering to the holder by crimping processing of the igniter fixing engagement part was zero at minimum and two at maximum for burrs, of 0.2 mm or more, and among them, there was zero burr of 2.1 mm or more in each sample. In the gas generator holder according to the example, the number of burrs adhering to the holder by crimping processing of the cup fixing engagement part was zero for burrs of 0.2 mm or more in each sample.

On the other hand, in the gas generator holder according to the comparative example, the number of burrs adhering to the holder by crimping processing of the igniter fixing engagement part was two at minimum and five at maximum for burrs of 0.2 mm or more, and among them, there were, at maximum, two burrs of 2.1 mm or more. In the gas generator holder according to the comparative example, the number of burrs adhering to the holder by crimping processing of the cup fixing engagement part was zero at minimum and one at maximum for burrs of 0.2 mm or more, and among them, there was, at maximum, one burr of 2.1 mm or more.

As shown in FIG. 9, after crimping the igniter fixing engagement part of the gas generator holder according to the example five times consecutively, burrs adhering to a crimping processing die used for the crimping processing included three burrs of a size of 0.6 mm. After crimping the cup fixing engagement part of the gas generator holder according to the example five times consecutively, burrs adhering to the crimping processing die used for the crimping processing included zero burr of a size of 0.2 mm or more.

On the other hand, after crimping the igniter fixing engagement part of the gas generator holder according to the comparative example five times consecutively, burrs adhering to a crimping processing die used for the crimping processing included one burr of a size of 5.0 mm and one burr of a size of 13.0 mm. After crimping the cup fixing engagement part of the gas generator holder according to the comparative example five times consecutively, burrs adhering to the crimping processing die used for the crimping processing included one of a size of 0.3 mm, one of a size of 0.6 mm, one of a size of 0.9 mm, and one of a size of 2.1 mm.

The distance between the terminal pins of the igniter provided for the gas generator is in many cases set at 2.1 mm depending on the specification. Therefore, when a burr caused by the above-described crimping processing has a size of 2.1 mm or more, the burr may adhere so as to bridge these terminal pins to cause a short circuit. On the other hand, when a burr caused by the above-described crimping processing has a size of 0.2 mm or less, it is sufficiently possible to remove it by an easy cleaning operation, and a serious problem such as the above-mentioned short circuit will not arise. Therefore, when evaluating the occurrence state of burrs in the gas generator holders according to the example and the comparative example using 0.2 mm and 2.1 mm mentioned above as the reference, the evaluation results are as shown in FIGS. 8 and 9.

Figure 10A:
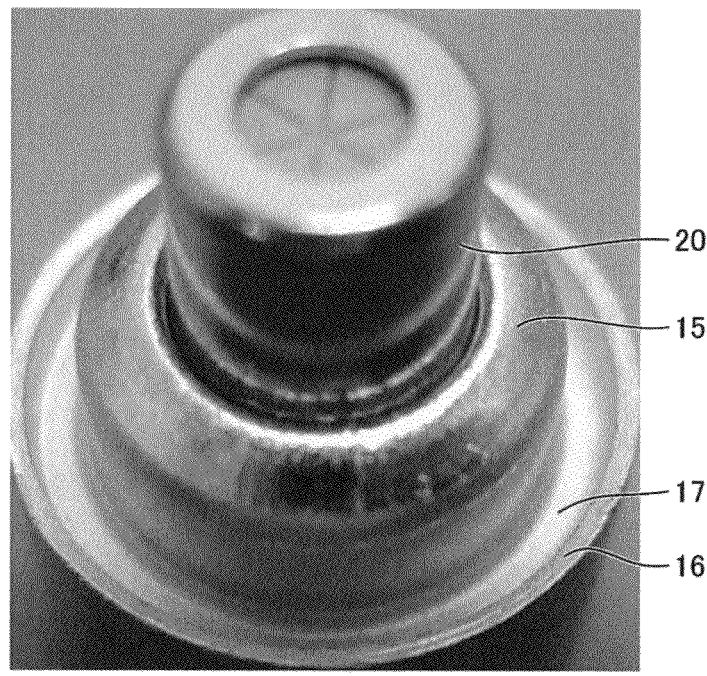
FIG. 10A is a typical photograph showing the adhesion state of burrs after crimping processing of the gas generator holder according to the example, taken after fixing by crimping an igniter to the holder using an igniter fixing engagement part.
Figure 10B:
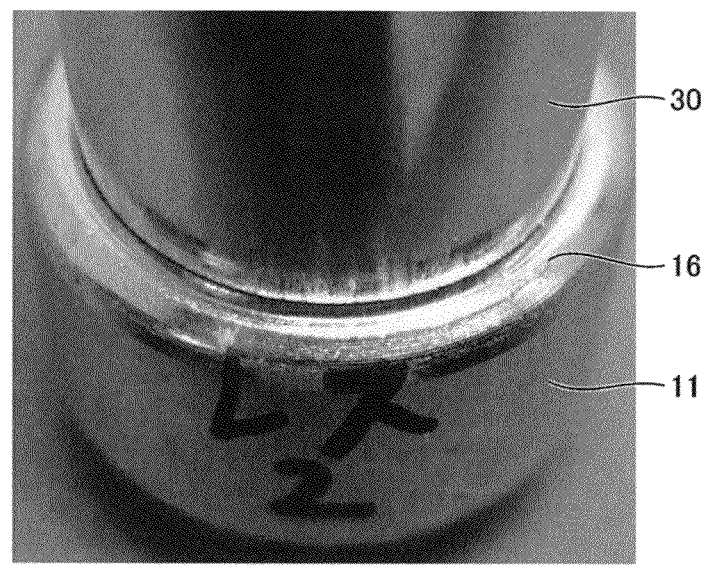
FIG. 10B is a typical photograph showing the adhesion state of burrs after crimping processing of the gas generator holder according to the example, taken after fixing by crimping a cup to the holder using a cup fixing engagement part.
Figure 11A:
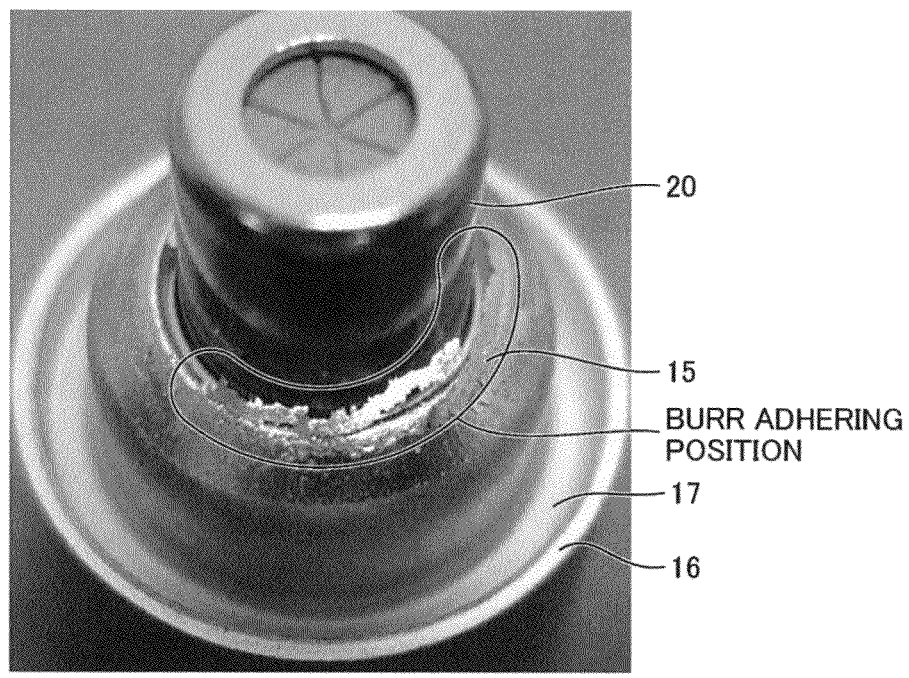
FIG. 11A is a typical photograph showing the adhesion state of burrs after crimping processing of the gas generator holder according to the comparative example, taken after fixing by crimping an igniter to the holder using an igniter fixing engagement part.
Figure 11B:
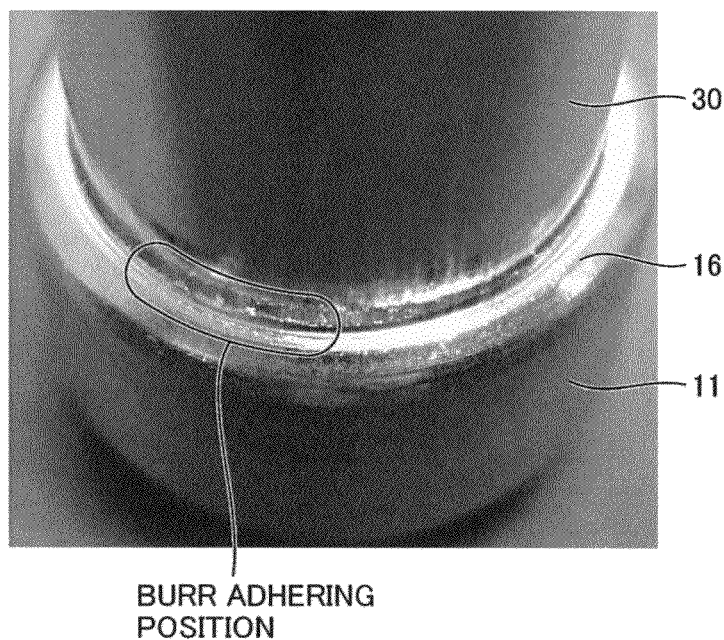
FIG. 11B is a typical photograph showing the adhesion state of burrs after crimping processing of the gas generator holder according to the comparative example, taken after fixing by crimping a cup to the holder using a cup fixing engagement part.

FIGS. 10A and 10B show typical photographs showing the adhesion state of burrs after crimping processing of the gas generator holder according to the example in the verification test mentioned above. FIGS. 11A and 11B show typical photographs showing the adhesion state of burrs after crimping processing of the gas generator holder according to the comparative example. FIGS. 10A and 11A each show a photograph after fixing by crimping the igniter to the holder using the igniter fixing engagement part. FIGS. 10B and 11B each show a photograph after fixing by crimping the cup to the holder using the cup fixing engagement part.

Figure 12A:
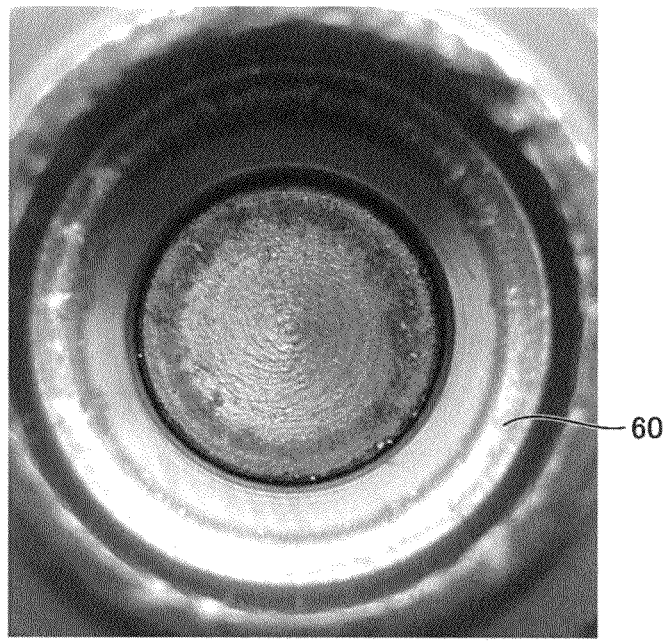
FIG. 12A is a photograph showing the adhesion state of burrs to a die after crimping processing of the gas generator holder according to the example, taken after fixing by crimping the igniter to the holder using the igniter fixing engagement part.
Figure 12B:
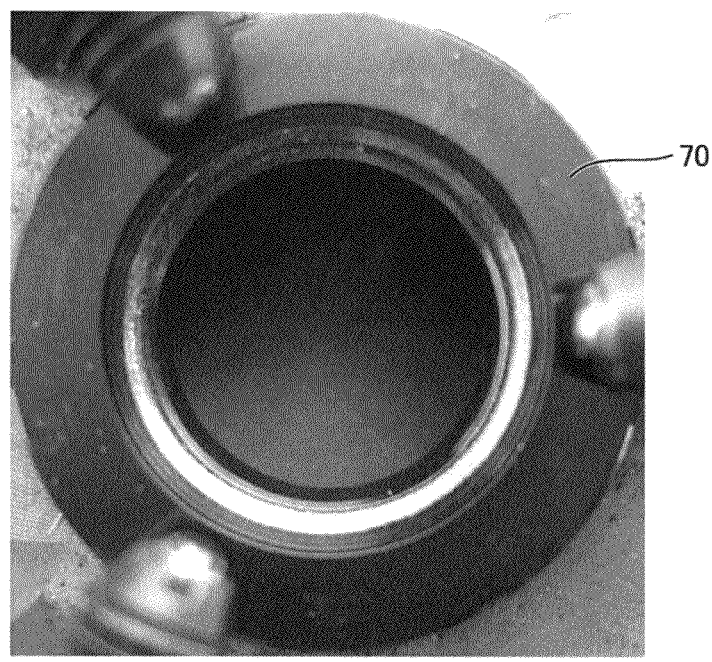
FIG. 12B is a photograph showing the adhesion state of burrs to the die after crimping processing of the gas generator holder according to the example, taken after fixing by crimping the cup to the holder using the cup fixing engagement part.
Figure 13A:
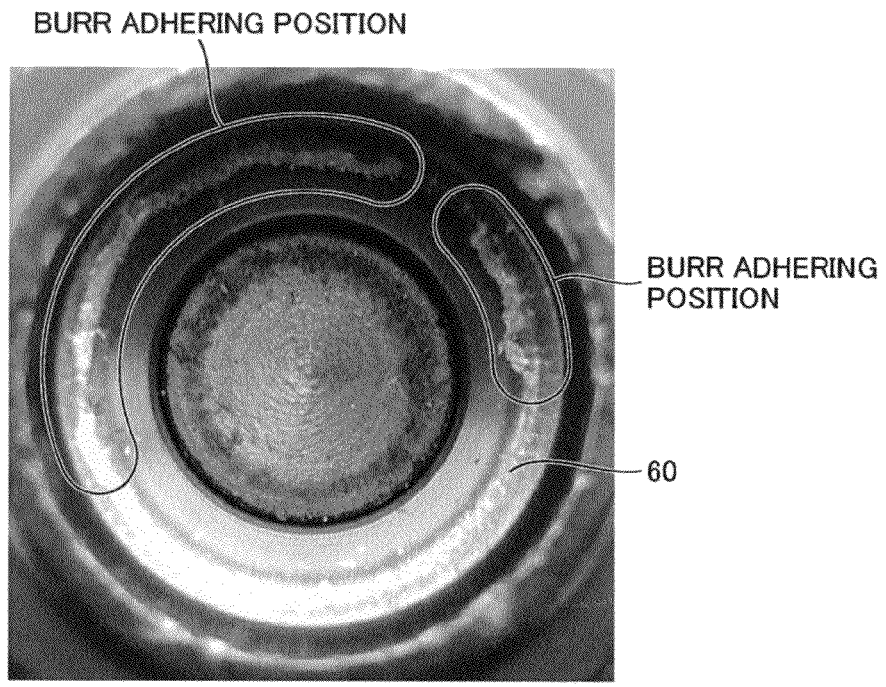
FIG. 13A is a photograph showing the adhesion state of burrs to a die after crimping processing of the gas generator holder according to the comparative example, taken after fixing by crimping the igniter to the holder using the igniter fixing engagement part.
Figure 13B:
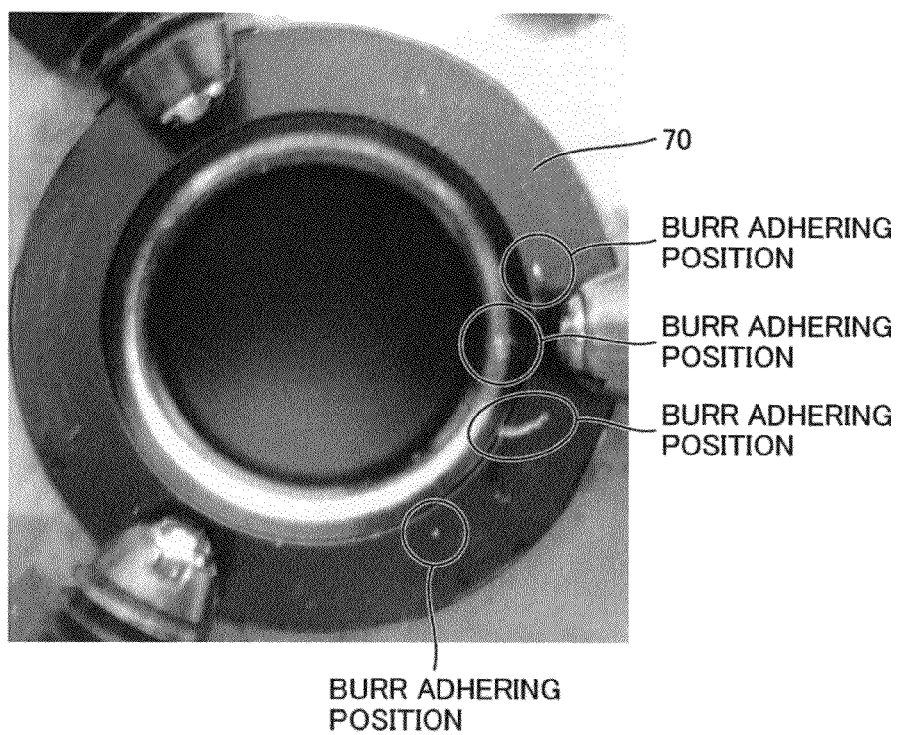
FIG. 13B is a photograph showing the adhesion state of burrs to the die after crimping processing of the gas generator holder according to the comparative example, taken after fixing by crimping the cup to the holder using the cup fixing engagement part.

FIGS. 12A and 12B are photographs showing the adhesion state of burrs to a die after crimping processing of the gas generator holder according to the example in the verification test mentioned above. FIGS. 13A and 13B are photographs showing the adhesion state of burrs to a die after crimping processing of the gas generator holder according to the comparative example. FIGS. 12A and 13A each show a photograph of the crimping processing die for crimping processing the igniter fixing engagement part. FIGS. 12B and 13B each show a photograph of the crimping processing die for crimping processing the cup fixing engagement part. The portions indicated by numerals 60 and 70 in FIGS. 12A to 13B are portions of the crimping processing die brought into contact with igniter fixing engagement part 15 and cup fixing engagement part 16, respectively.

From the results of the above verification test and also as seen from these photographs, it was confirmed that a sufficiently good result (that is, the effect of effectively preventing burrs from occurring as compared with conventional cases) was obtained in the gas generator according to the example.

In the above-described embodiment of the present invention, the case where igniter 20 and cup 30 are both fixed to holder 10 using crimping processing has been described by way of example, however, when one of igniter 20 and cup 30 is configured to be fixed to holder 10 using crimping processing and the other one is configured to be fixed to holder 10 using another fixing method, the present invention is also applicable to the one one of them as a matter of course.

Thus, the aforementioned embodiment disclosed herein is illustrative in all points, and not restrictive. The technical range of the present invention is defined by claims, and includes all modifications within the meaning and range equivalent to the description of claims.

REFERENCE SIGNS LIST

1 gas generator; 10 holder; 11 body part; 11a tubular part; 11b partitioning part; 12 first recess; 13a engagement groove; 13 second recess; 14 through-hole; 15 igniter fixing engagement part; 16 cup fixing engagement part; 17 groove; 18 fixed part; 20 igniter; 21 ignition part; 22 terminal pin; 23 base; 25 cover member; 25a bottom wall; 26 flame introducing opening; 28 sealing member; 30 cup; 31 sidewall; 32 bottom wall; 33 flange part; 34 storage space; 35 gas generating agent; 41-45, 51 die; 52 punching die; M metal flow.

The invention claimed is:

1. A method for manufacturing a gas generator holder made of metal used with a cup filled with a gas generating agent and an igniter for burning the gas generating agent assembled thereto, the gas generator holder comprising a body part; and an igniter fixing engagement part projecting from said body part and being bent such that a part of the igniter is sandwiched between said igniter fixing engagement part and said body part, thereby fixing the igniter by crimping, wherein said igniter fixing engagement part is finish shaped by forging processing, so that a metal flow appearing in a superficial layer of said igniter fixing engagement part extends continuously from said body part through said igniter fixing engagement part to return to said body part, without being divided in a surface of said igniter fixing engagement part, the method comprising the steps of:

forming a slug; and subjecting one of said slug and a product of said slug to forging processing, thereby finish shaping said igniter fixing engagement part.

2. The method for manufacturing the gas generator holder according to claim 1, further comprising the steps of:

performing a heat treatment as a solution treatment before the step of finish shaping said igniter fixing engagement part; and performing a heat treatment as an artificial aging treatment after the step of finish shaping said igniter fixing engagement part.

3. A method for manufacturing a gas generator holder made of metal used with a cup filled with a gas generating agent and an igniter for burning the gas generating agent assembled thereto, the gas generator holder comprising a body part; and an igniter fixing engagement part projecting from said body part and being bent such that a part of the igniter is sandwiched between said igniter fixing engagement part and said body part, thereby fixing the igniter by crimping, wherein said igniter fixing engagement part is finish shaped by forging processing, so that a metal flow appearing in a superficial layer of said igniter fixing engagement part extends continuously from said body part through said igniter fixing engagement part to return to said body part, without being divided in a surface of said igniter fixing engagement part, the gas generator holder further comprising a cup fixing engagement part projecting from said body part and being bent such that a part of the cup is sandwiched between said cup fixing engagement part and said body part, thereby fixing the cup by crimping, wherein said cup fixing engagement part is finish shaped by forging processing, so that the metal flow appearing in a superficial layer of said cup fixing engagement part extends continuously from said body part through said cup fixing engagement part to return to said body part, without being divided in a surface of said cup fixing engagement part, the method comprising the steps of:
- forming a slug; and
- subjecting one of said slug and a product of said slug to forging processing, thereby finish shaping said igniter fixing engagement part and said cup fixing engagement part.

4. The method for manufacturing the gas generator holder according to claim 3, further comprising the steps of:
- performing a heat treatment as a solution treatment before the step of finish shaping said igniter fixing engagement part and said cup fixing engagement part; and
- performing a heat treatment as an artificial aging treatment after the step of finish shaping said igniter fixing engagement part and said cup fixing engagement part.

5. A method for manufacturing a gas generator holder made of metal used with a cup filled with a gas generating agent and an igniter for burning the gas generating agent assembled thereto, comprising a body part; and a cup fixing engagement part projecting from said body part and being bent such that a part of the cup is sandwiched between said cup fixing engagement part and said body part, thereby fixing the cup by crimping, wherein said cup fixing engagement part is finish shaped by forging processing, so that a metal flow appearing in a superficial layer of said cup fixing engagement part extends continuously from said body part through said cup fixing engagement part to return to said body part, without being divided in a surface of said cup fixing engagement part, the method comprising the steps of:
- forming a slug; and
- subjecting one of said slug and a product of said slug to forging processing, thereby finish shaping said cup fixing engagement part.

6. The method for manufacturing the gas generator holder according to claim 5, further comprising the steps of:
- performing a heat treatment as a solution treatment before the step of finish shaping said cup fixing engagement part; and
- performing a heat treatment as an artificial aging treatment after the step of finish shaping said cup fixing engagement part.

7. A method for manufacturing a gas generator comprising a cup filled with a gas generating agent generating gas by combustion; an igniter arranged to face said gas generating agent and ignited at a time of working to burn said gas generating agent; and a holder made of metal with said cup and said igniter assembled thereto, wherein said holder includes a body part and an igniter fixing engagement part projecting from said body part, said igniter fixing engagement part is bent such that a part of said igniter is sandwiched between said igniter fixing engagement part and said body part, so that said igniter is fixed by crimping to said holder, and said igniter fixing engagement part is finish shaped by forging processing, so that a metal flow appearing in a superficial layer of said igniter fixing engagement part extends continuously from said body part through said igniter fixing engagement part to return to said body part, without being divided in a surface of said igniter fixing engagement part, the method comprising the steps of:
- producing said holder; and
- assembling said gas generator using said holder,
- the step of producing said holder including the steps of
  - forming a slug, and
  - subjecting one of said slug and a product of said slug to forging processing, thereby finish shaping said igniter fixing engagement part, the step of assembling said gas generator including the steps of
  - bending said igniter fixing engagement part, thereby fixing by crimping said igniter to said holder, and
  - assembling said cup filled with said gas generating agent to said holder with said igniter assembled thereto.

8. The method for manufacturing the gas generator according to claim 7, wherein the step of producing said holder includes the steps of:
- performing a heat treatment as a solution treatment before the step of finish shaping said igniter fixing engagement part; and
- performing a heat treatment as an artificial aging treatment after the step of finish shaping said igniter fixing engagement part.

9. A method for manufacturing a gas generator comprising a cup filled with a gas generating agent generating gas by combustion; an igniter arranged to face said gas generating agent and ignited at a time of working to burn said gas generating agent; and a holder made of metal with said cup and said igniter assembled thereto, wherein said holder includes a body part and an igniter fixing engagement part projecting from said body part, said igniter fixing engagement part is bent such that a part of said igniter is sandwiched between said igniter fixing engagement part and said body part, so that said igniter is fixed by crimping to said holder, and said igniter fixing engagement part is finish shaped by forging processing, so that a metal flow appearing in a superficial layer of said igniter fixing engagement part extends continuously from said body part through said igniter fixing engagement part to return to said body part, without being divided in a surface of said igniter fixing engagement part, wherein said holder further includes a cup fixing engagement part projecting from said body part, said cup fixing engagement part is bent such that a part of said cup is sandwiched between said cup fixing engagement part and said body part, so that said cup is fixed by crimping to said holder, and said cup fixing engagement part is finish shaped by forging processing, so that the metal flow appearing in a superficial layer of said cup fixing engagement part extends continuously from said body part through said cup fixing engagement part to return to said body part, without being divided in a surface of said cup fixing engagement part, the method comprising the steps of:
- producing said holder; and
- assembling said gas generator using said holder,
- the step of producing said holder including the steps of
  - forming a slug, and
  - subjecting one of said slug and a product of said slug to forging processing, thereby finish shaping said igniter fixing engagement part and said cup fixing engagement part,
- the step of assembling said gas generator including the steps of
  - bending said igniter fixing engagement part, thereby fixing by crimping said igniter to said holder, and
  - bending said cup fixing engagement part, thereby fixing by crimping said cup filled with said gas generating agent to said holder with said igniter assembled thereto.

10. The method for manufacturing the gas generator according to claim 9, wherein the step of producing said holder includes the steps of:

performing a heat treatment as a solution treatment before the step of finish shaping said igniter fixing engagement part and said cup fixing engagement part; and performing a heat treatment as an artificial aging treatment after the step of finish shaping said igniter fixing engagement part and said cup fixing engagement part.

11. A method for manufacturing a gas generator comprising a cup filled with a gas generating agent generating gas by combustion; an igniter arranged to face said gas generating agent and ignited at a time of working to burn said gas generating agent; and a holder made of metal with said cup and said igniter assembled thereto, wherein said holder includes a body part and a cup fixing engagement part projecting from said body part, said cup fixing engagement part is bent such that a part of said cup is sandwiched between said cup fixing engagement part and said body part, so that said cup is fixed by crimping to said holder, and said cup fixing engagement part is finish shaped by forging processing, so that a metal flow appearing in a superficial layer of said cup fixing engagement part extends continuously from said body part through said cup fixing engagement part to return to said body part, without being divided in a surface of said cup fixing engagement part, the method comprising the steps of:

producing said holder; and assembling said gas generator using said holder, the step of producing said holder including the steps of
    forming a slug, and
    subjecting one of said slug and a product of said slug to forging processing,
thereby finish shaping said cup fixing engagement part,
the step of assembling said gas generator including the steps of
    assembling said igniter to said holder, and
    bending said cup fixing engagement part, thereby fixing by crimping said cup filled with said gas generating agent to said holder with said igniter assembled thereto.

12. The method for manufacturing the gas generator according to claim 11, wherein the step of producing said holder including the steps of:

performing a heat treatment as a solution treatment before the step of finish shaping said cup fixing engagement part, and performing a heat treatment as an artificial aging treatment after the step of finish shaping said cup fixing engagement part.

* * * * *